United States Patent [19]

Tisone et al.

[11] 4,104,507
[45] Aug. 1, 1978

[54] PTC HEATER FOR ENHANCING THERMAL ACTUATOR RESPONSE

[75] Inventors: Thomas C. Tisone, Thousand Oaks, Calif.; Helmut H. A. Krueger, Elgin, Ill.; Ronald S. Sobecks, Seven Hills, Ohio; Richard N. Tauber, Rancho Palos Verdes, Calif.

[73] Assignee: Design & Manufacturing Corporation, Willoughby, Ohio

[21] Appl. No.: 759,280

[22] Filed: Jan. 14, 1977

[51] Int. Cl.² .............................................. H05B 1/02
[52] U.S. Cl. ...................................... 219/513; 60/531; 219/222; 219/505; 338/22 R
[58] Field of Search ........ 219/210, 222, 301, 505–510, 219/511, 513; 60/526, 527, 530, 531; 132/33 R, 39; 292/201; 338/22 R, 225 D, 23

[56] References Cited

U.S. PATENT DOCUMENTS

| | | | |
|---|---|---|---|
| 3,414,704 | 12/1968 | Flanagan | 219/210 |
| 3,414,705 | 12/1968 | Marcoux | 219/210 |
| 3,617,694 | 11/1971 | D'Entremont | 219/222 |
| 3,617,695 | 11/1971 | Meyer et al. | 219/222 |
| 3,632,971 | 1/1972 | Flanagan | 219/222 |
| 3,662,698 | 5/1972 | Stropkay | 60/531 X |
| 3,689,736 | 9/1972 | Meyer | 219/505 X |
| 3,782,121 | 1/1974 | Marcoux et al. | 60/527 |
| 3,973,100 | 8/1976 | Flanagan | 219/505 X |
| 3,991,572 | 11/1976 | Huebscher et al. | 60/531 |
| 4,016,722 | 4/1977 | Niederer | 60/531 |

*Primary Examiner*—Volodymyr Y. Mayewsky
*Attorney, Agent, or Firm*—Maky, Renner, Otto & Boisselle

[57] ABSTRACT

A positive temperature coefficient heater for enhancing the response time of thermal actuators is disclosed. The PTC heater is formed of a generally low resistance material that has an anomaly temperature above which the resistance of the heater increases dramatically. The anomaly temperature is chosen to substantially match the phase change temperature of a thermally expansive medium useful to power the actuator. The heater is self-regulating and provides a maximum surface area for heating the medium rapidly with a minimum of thermal mass and energy use. Preferably, the heater is formed of doped $BaTiO_3$ in the general shape of an elongated annular cylinder.

11 Claims, 8 Drawing Figures

PTC HEATER FOR ENHANCING THERMAL ACTUATOR RESPONSE

BACKGROUND OF THE INVENTION

1. Field of the Invention

The invention pertains generally to electrothermal actuator systems and is particularly directed to positive temperature coefficient heating elements for such systems.

2. Prior Art

Actuators are presently being accepted to accomplish many tasks formerly assigned to electric and vacuum motors, solenoids, and cables. This is especially true in difficult areas such as remotely operating baffles, dampers, or latch mechanisms. The actuator's cost, size, and weight advantages over generally available conventional systems are indicators that this trend will continue.

A particularly favorable actuator is of a type termed electrothermal. In this mechanism a heater assembly is provided to convert electrical energy into thermal energy. The thermal energy is employed to expand a medium which applies force to an operating member, usually a piston. The piston can be used to cause actuations as the medium is expanded throughout the operation.

The thermally expansive medium usually is heated through a phase change, either solid to liquid or liquid to gaseous, causing a resulting increase in volume to produce the maximum amount of pressure for a given amount of energy.

In the prior art a number of different heaters for the thermally expansive mediums have been utilized. In some cases fixed resistance heaters have been looked to for supplying thermal energy in these actuator systems. However, fixed resistance heating elements have been difficult to maintain at a constant temperature and require some form of external thermostatic control to provide suitable actuation characteristics.

To solve this regulation problem common to fixed resistance heaters some in the art have turned to positive temperature coefficient (PTC) heaters. A PTC material is one which exhibits a low resistance at ambient temperatures but when such a material is raised above an anomaly or Curie temperature it exhibits a rapid increase in resistance of at least several orders of magnitude. This is an ideal characteristic for an actuator heater; whereby the heater can draw large amounts of current and input power (inrush) to reach the Curie temperature thus expanding the working medium and then subsequently cut off its power by increasing the resistance. Thereafter, as the temperature changes the resistance will adjust to allow more or less current to be drawn and consequently readjust the temperature back to the operating point. These devices are therefore essentially self-regulating to a considerable extent.

Examples of linear actuators having PTC heating elements are found in a U.S. Pat. No. 3,686,857 issued to Berg and a U.S. Pat. No. 3,782,121 issued to Marcoux et al. The patents illustrate a PTC heater with a disc shape for energizing a linear actuator including a working medium that changes from a solid phase to a liquid phase.

Configurations other than disc shaped for PTC heaters are known but exist in commercial products dissimilar to linear actuators. U.S. Pat. No. 3,632,971 issued to Flanagan describes an elongated annulus of PTC material in a heater element for a consumer product. This heater generally lacks at least some of the important characteristics necessary for heaters used in fast acting linear actuators.

Normally actuators using PTC disc heaters work efficiently in the environment in which they were intended to operate but there are certain situations where more rapid actuations are needed. To accomplish rapid actuation the heater must be configured to thermally expand the working medium as quickly as possible. Conventional PTC disc actuators have not been presently able to meet the response times desired by designers.

Thus attempts have been made to design fast acting actuators by forming arrays of PTC discs. These arrays, however, are complicated in construction and electrode structure and are relatively expensive. Moreover, because of their complicated construction requiring multiple heater mountings they are more susceptible to failure from the physical shocks which are encountered in many actuator environments.

SUMMARY OF THE INVENTION

The invention provides a PTC heater for enhancing the response time of an actuator. In a preferred embodiment the heater is formed integrally from a PTC material, such as doped barium titanate, doped $BaTiO_3$, into an advantageous configuration comprising a thin elongated annular cylinder. The heater annulus is powered by an electrode structure that produces an electrical potential between the inner and an outer face of the annulus. The potential raises the heater quickly to an anomaly temperature which is above the phase change temperature of the working medium contained in an actuator boiler. The phase change caused will provide sufficient expansive forces to extend a working member of the actuator.

The annular heater configuration of the present invention provides numerous advantages for enhancing the response time of an actuator. One advantage of the annular configuration is the maximization of the surface area of the heater in contact with the working medium while providing a configuration compatible with the cylindrical geometry commonly used for actuators. A greater surface area allows a quicker transfer of thermal energy from the heater to the medium. In the annular configuration both the inner and outer faces are available as heating surface area.

The thin wall of the annulus further contributes to the maximization of the surface area according to one aspect of the invention. Also, the thin annular wall is advantageous in reducing the amount of material used in the heater and its nominal thermal mass. This results in energy savings as less energy has to be used to bring the heater material up to operating temperature which is a prerequisite before thermal transfer to the working medium can occur.

A small thermal mass for the heater additionally permits a rapid cooling of the annulus and allows a consequent rapid contraction of the fluid medium. This feature is important when the actuator must be cycled rapidly as the cycle time of an actuator is not only limited by the actuation time but also by the time it takes to release its force.

The reduction of the possibility of thermal shock failure is further an advantage of the annular configuration. This phenomenon usually occurs when a portion of the crystal structure in a heater is expanding or contracting at a faster rate than other portions. This differential expansion puts great stresses and strains on adjacent sections of the crystal causing mechanical fracture. Fractures of this type occur more readily in heaters drawing large inrush currents necessary for rapid actuation.

The heating current in the present invention is conducted between the surfaces of the thin walled annular heater and therefore will increase faster but more evenly in temperature than would a thick crystal structure. Thus, the surface temperature of the annulus is close to that of the midplane. The curved surfaces of the annulus also help relieve some of the pressures exerted by the differentials in the temperatures that are caused by the rapid heating needed for quick actuation.

Still further, the annular configuration for the heater is structurally strong and more resistant to failure from environmental perturbations than arrays of disc heaters or the like.

Finally, the heater of the present invention is integrally made and of a relatively simple construction that is able to be mounted easily into an uncomplicated electrode structure.

Therefore, it is an object of the invention to provide a PTC heater that enhances the response time of an electrothermal actuator.

It is another object of the invention to provide a PTC heater that presents a maximum of heating surface area to the working medium of a thermal actuator.

It is still another object of the invention to provide an improved PTC heater that has a reduced thermal mass.

It is still another object of the invention to provide a PTC heater than has a thin wall which heats rapidly.

A further object of the invention is to provide a PTC heater for a thermal actuator that is less susceptible to failure because of thermal shock.

A still further object of the invention is to provide a PTC heater for a thermal actuator that is easy to manufacture and assemble within a configuration resistant to environmental shocks.

These and other objects, features, and advantages of the invention will be more fully understood and appreciated upon reference to the following detailed description taken in conjunction with the appended drawings wherein.

DETAILED DESCRIPTION OF THE PREFERRED EMBODIMENT

Figure 1:
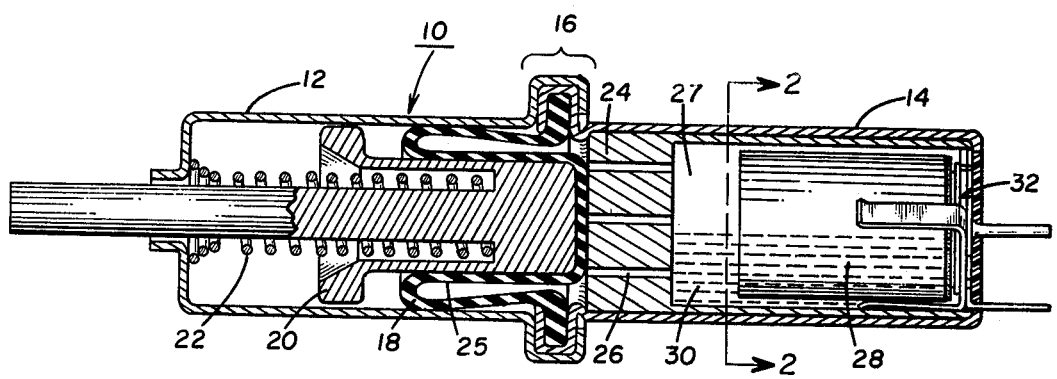
FIG. 1 is a cross sectional side view of an electrothermal actuator with a PTC heater constructed in accordance with the present invention.

With reference now to FIG. 1 there is illustrated an electrothermal actuator generally designated 10. The actuator 10 is comprised of a cylindrically shaped end cap 12 and a boiler enclosure 14. The boiler 14 and end cap 12 are crimped together at 16 to form an outer enclosure or body for the actuator 10. Inside the enclosure at the center and crimped thereto at 16 is an elastomeric diaphragm 18 which will roll forward under the influence of pressure from a working medium 30. Partially enfolded by the diaphragm 18 and extending outwardly through an aperture in the end cap 12 is a piston 20. A return spring 22 retains the piston 20 against the diaphragm 18 in an unactuated position as illustrated in FIG. 1.

On the opposite side of the diaghragm 18 which divides the actuator 10 is an enclosed space defined by the boiler enclosure 14 and an inner diaphragm surface 25. This is the area in which the working medium 30 expands and provides useful work. The enclosed space includes within it a generally cylindrical sleeve 24 which has a plurality of ports 26 that communicate the working medium between a sleeve reservoir 27 and the enclosed side of the diaphragm 18.

Located within the sleeve reservoir 27 is a heater assembly comprising a generally annular heater 28 mounted by an electrode assembly 32. The working medium 30 can either fill or partially fill the reservoir 27 and is in intimate contact with the heater 28.

In normal operation, the actuator 10 is energized by the application of electrical power to the electrode assembly 32 in some conventional way. Because of its contact with the electrode assembly the current will pass through the heater 28 and cause resistive heating to take place. The heater will thus release or dissipate the energy into the contacting working medium 30 as thermal energy. The working medium 30 will absorb the thermal energy produced by the heater 28 until its temperature rises to a point where a phase change will take place. The working medium is chosen so that the phase change produces an increase in volume and consequently pressure within the enclosed space. In the manner described it is noted either a solid to liquid, liquid to gaseous, or solid to gaseous phase change can be used. Further, even a gaseous phase with an increasing vapor pressure with respect to temperature is possible as a working medium.

The increased volume and pressure forces the elastomeric diaphragm 18 to roll forward and extend the piston 20 into an actuated position. When the actuator is to be released the power is cut off to the heater 28 causing it to cool. The working medium 30, no longer having a source of thermal energy for its increased volume and pressure, contracts rapidly as it cools and returns to its original phase. The return spring 22 then reciprocates the piston 20 to its inactuated position.

The operation and construction of an electrothermal actuator of this type will be more fully understood by reference to copending application Ser. No. 753,700, filed Dec. 23, 1976, now U.S. Pat. No. 4,070,859 for "Thermal Fluid Displacement Actuator" and Ser. No. 753,890, filed Dec. 23, 1976, now U.S. Pat. No. 4,079,589, for "Electro-Thermal Actuator with Valved Boiler Configuration", the disclosures of which is hereby incorporated by reference.

The heater assembly of the electrothermal actuator including the heater 28 and the electrode structure 32 is better illustrated by reference to FIG. 2 wherein the boiler enclosure 14 and the sleeve 24 are seen to be generally concentric with the annular heater 28. The heater is spaced away from the sleeve 24 slightly to provide clearance for the working medium to come into contact with the outside cylindrical surface of the heater 28. The inner surface of the heater 28 also generally defines a cylindrical surface which heats the working medium 30.

Figure 2:
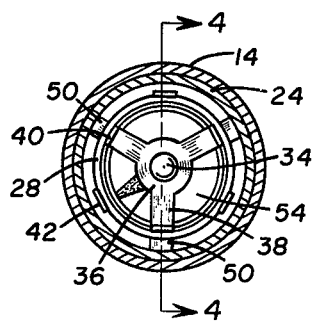
FIG. 2 is a cross sectional end view of the thermal actuator illustrated in FIG. 1 taken along section line 2—2.
Figure 3:
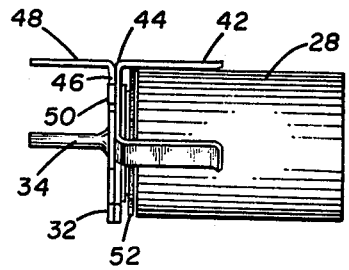
FIG. 3 is an elevational side view of the heater assembly for the thermal actuator illustrated in FIG. 1.

With reference now to both FIGS. 2 and 3, the electrode assembly 32 comprises an electrode 34 connected to an inner contact plate 36 which extends into radially outreaching spokes 38 and spring contacts 40. The contacts 40 are sprung slightly outward to ensure a positive contacting force against the inner face of the annular heater 28.

The outer surface of the heater 28 likewise has a plurality of spring contacts 42 in conducting contact with it. These contacts 42, better seen in FIG. 3 extend upwardly from a generally flat circular outer plate 44. The outer contact plate 44 rests upon and is affixed to a base plate 46 of the same flat generally circular shape. On the outer periphery of the base plate 46 are an electrode 48 and a plurality of radially extending tabs 50. The tabs 50 function to center the heater assembly within the boiler enclosure 14 and the sleeve 24. The outer contacts 42 are bent slightly inward to provide a sure contacting force against the outer face of the heater 28. The inner and outer contacts 40,42 are therefore oppositely biased and act together to hold the heater 28 between them.

A simple mounting of the heater 28 into the electrode assembly 32 is accomplished by spreading the spring contacts apart and then permitting the contacts 40,46 to close around to grip the heater 28. The heater thus floats in the contact mounting and is less susceptible to environmental vibration than would be a rigidly mounted heater member. Therefore, it is seen that the electrode assembly 32 for the heater 28 is much simpler than one which would be necessary for an array of disc PTCs.

Figure 4:
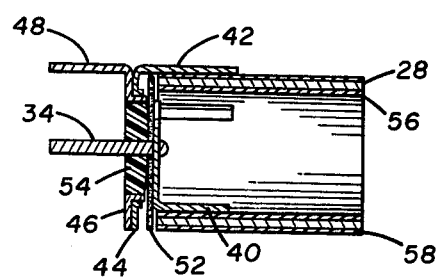
FIG. 4 is a cross sectional side view of the heater assembly for the electrothermal actuator illustrated in FIG. 1 taken along section line 4—4 in FIG. 2.

As can be better illustrated in FIG. 4, the heater 28 is protected from shorting the spring contacts together by resting against an insulative pad 52. The inner and outer electrodes are also separated by an insulative material 54 which holds electrode 34 centered in an aperture through the base plate 46 and the outer contact plate 44.

The elongated annular PTC heater 28 can be coated with a conductive covering 56 over the inner surface and a conductive covering 58 over the outer surface. These coverings promote the even distribution of current from the electrode contacts 40,42 and further the objectives of even heating over the surfaces of the heater 28. Advantageously, the conductive coatings can be plated, electroformed, sprayed, etc., onto the PTC heater 28 and comprise nickel, silver, or similar conductors. Heating current flows from one of the faces to the other through the thin wall.

The heater 28 is preferably comprised of a PTC material. There are many advantageous materials of this type which have a relatively small input resistance at ambient temperatures that increases by several orders of magnitude when the temperature is increased through an anomaly temperature. Semiconducting ceramics, of which doped $BaTiO_3$ is a preferred example, are such materials. PTC materials are self-regulating and provide a substantially constant operating temperature for the heater 28. Dopant materials to change the normally insulating ceramics into semiconductors are known in the art.

The annular configuration of the heater 28 provides a maximum of heating surface area for the working medium. The heating surface area includes the inner and outer cylindrical surfaces of the heater 28. In practice the length and diameter of the annular heater 28 are maximized to take full advantage of the space available within the boiler enclosure 14 while retaining an integral configuration.

In a 12 V actuator of the configuration generally shown in FIG. 1 and including a liquid working medium, FC-78 which is more particularly described hereinafter, the preferred size for the annular heater will be approximately 0.413 inch in length with an outer diameter of at least 10 millimeters. The heater will then have over 1 sq. in. of heating surface area. At ambient temperatures, this size of heater will produce an actuation time of approximately 2 sec. The wall thickness for such a heater should be less than 1 millimeter. The wall thickness as previously described is to be as thin as manufacturing limitations allow. A further physical limitation on thickness is that it must exceed the breakdown voltage for the material used which will vary according to the grain size of the ceramic PTC material chosen for the heater and the voltage requirements of of the actuator. For the preferred heater, a grain size that will accomodate the operating voltage plus a safety factor of one-half should be used, i.e., 18–20 Volts.

To illustrate the importance of maximum surface area to an electrothermal actuator it is necessary to discuss one of the mechanisms of heat transfer. It is believed that the theory which best indicates or explains the mechanism for a preferred liquid medium expansion in an electrothermal actuator is boiling heat transfer. The theory is used to describe a possible mode of heat transfer occurring when a liquid changes phase to a vapor upon heating. The type of boiling heat transfer that may be generally ascribed to the present actuator 10 is pool boiling which relates to a heating surface submerged in a pool of initially quiescent liquid.

It has generally been recognized that there are several distinct regimes of boiling heat-transfer. See L. S. Tong "Boiling Heat Transfer and Two-Phase Flow", John Wiley and Sons, Inc., New York (1967). These are shown graphically for a representative liquid ($H_2O$) in FIG. 5. The units are in a logarithmic scale and have been normalized to be a relative measure only. Plotted in the figure as one variable is the heat flux Q into the solution as a function of the surface superhe t $\Delta T$ of the heater 28. $\Delta T$ is the difference in the surface temperature of a heater and the boiling point of the liquid.

Normally in the regime from point A to point B the predominant mode of heat transfer is convection. For the regime from point B to point C the liquid near the surface is superheated and as a result evaporates, forming bubbles on nucleation sites. The bubbles transport the latent heat of the phase change and in addition increase the convective heat transfer through agitation of the liquid near the heating surface. This mechanism is termed nucleate boiling and has the property of high heat transfer for a small $\Delta T$. This region is the most desirable from the point of view of power versus amount of heat received by the liquid.

It is seen however that the heat flux cannot be increased indefinitely for nucleate boiling. Point C occurs when the population of bubbles becomes so high that the outgoing bubbles interfere with the path of the incoming liquid. The vapor will then form a partially insulating layer over the heating surface and the surface temperature rises. The point C is termed the boiling crisis.

In the range from point C to point D the boiling is unstable and is called partial film boiling or transition boiling. It is characterized by having the heating surface alternately covered by a vapor blanket and a liquid layer, resulting in an oscillation of surface temperatures. Continued input power will allow the surface to reach point D but with a decrease in heat flux.

In the region from point D to point E a stable film is formed around the heater and heat transfer reaches a minimum at point D since diffusion is the predominant mechanism. Further increases in temperature of the surface of the heater allows heat transfer to increase by thermal radiation.

Since large temperature increases are needed to operate in regions C-E it has been determined that the low actuation times of an actuator with a PTC heater of reasonable size and power consumption are limited by the onset of partial or stable film boiling. Therefore, reduced actuation times can be achieved more efficiently by increasing boiling surface area than temperature differentials.

Figure 5:
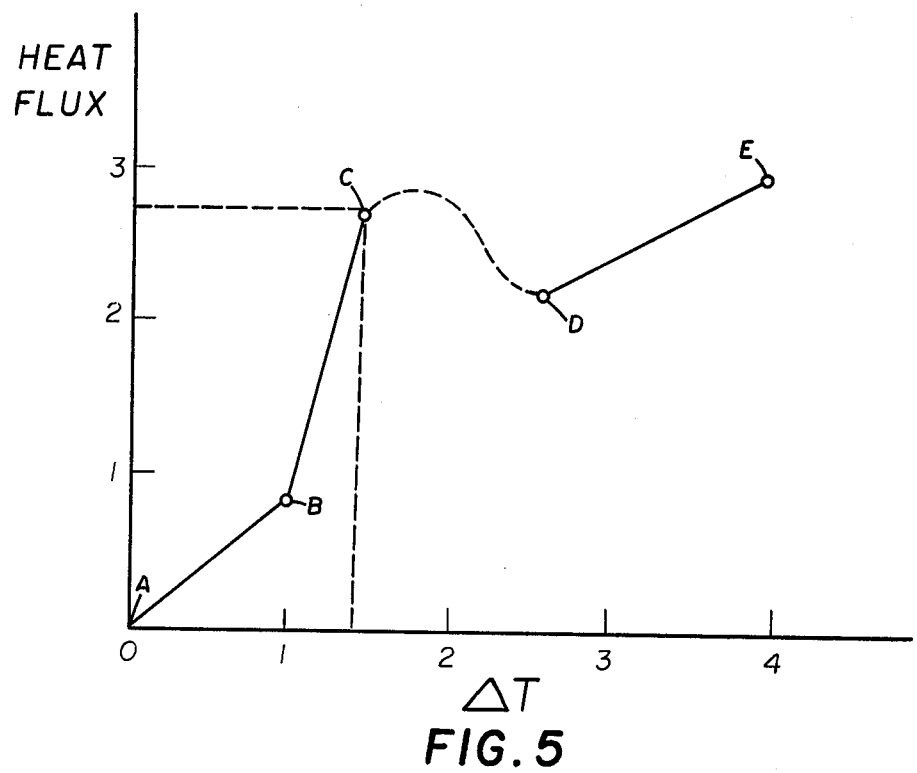
FIG. 5 is a graphical representation of the thermal phenomenon of a working medium for an electrothermal actuator during heating.

Thus not all the areas of the graph in FIG. 5 will apply to an actuator with a PTC heater since it should be designed to reach its switching temperature and increase its resistance to reduce the heat flux before regions C-E are entered to any great extent. A switching temperature at which the surface temperature approximates the boiling crisis will be advantageous.

It has been found that an advantageous operating temperature of 150° C. will be preferable for the heater 28. At this temperature the actuator will rapidly expand many liquids used as the working medium 30. The heater 28 will be raised to this operating temperature from approximately 20° C. with an initial resistance on the order of one-half ohm and an anomaly resistance increase of greater than $10^3$. The liquids that are of preferred use are a family of fluorocarbons similar to trichlorodifluoromethane sold under the trade designations of FC-77, FC-78 etc. by the 3M Corporation of St. Paul, Minn. Other useful working mediums include Ethanol $C_2H_5OH$, and 2-methyl-2 butanol, $CH_3CH_2(CH_3)_2OH$ or the like.

The best liquid working mediums are those which have a high heat of vaporization or a low boiling point. $H_2O$ cannot be advantageously used because of its electrolysis characteristic. Actuation times may be additionally reduced to some extent by the judicious choice of the working medium 30.

Figure 8:
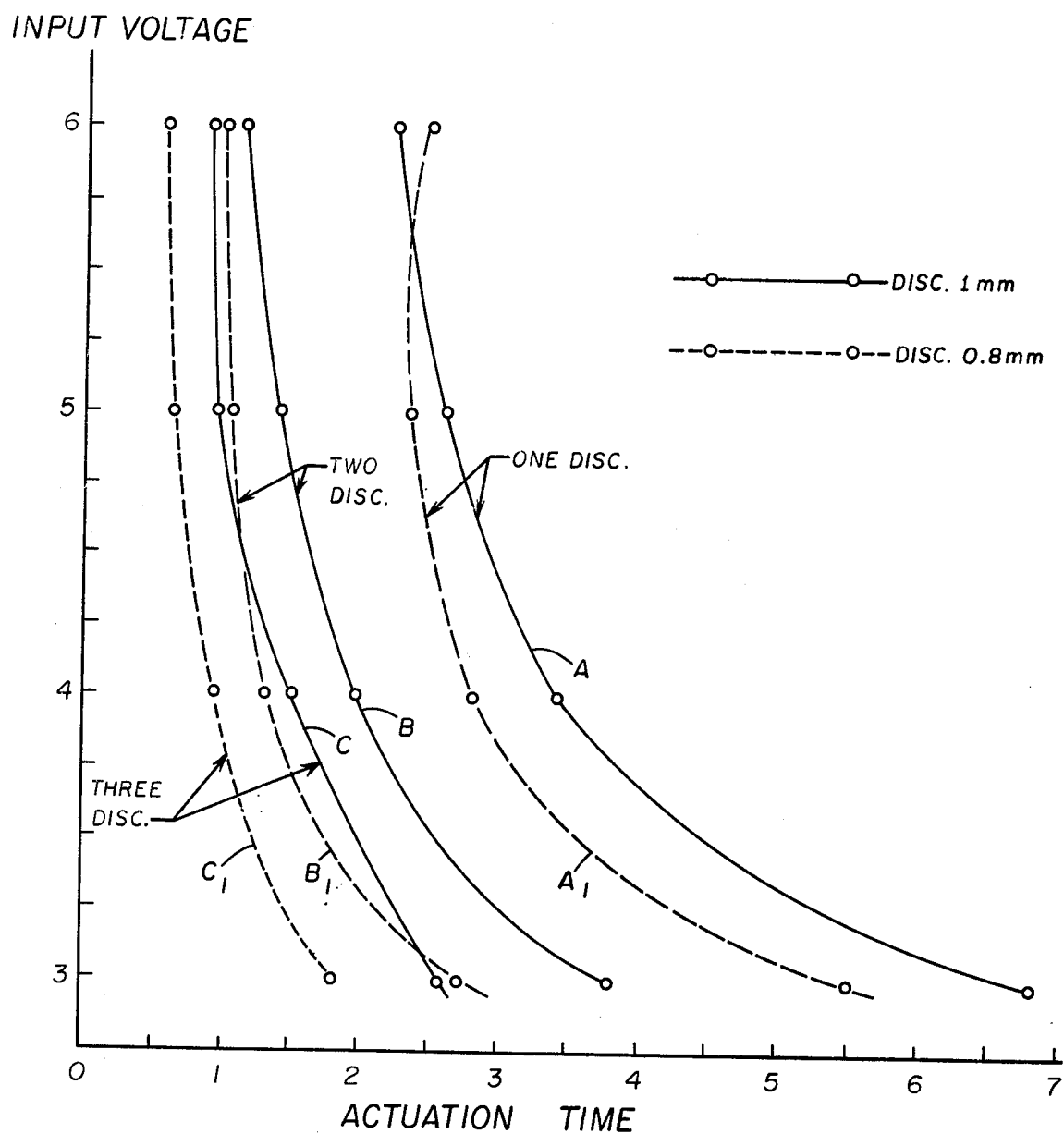
FIG. 8 is a graphical representation of the response times for electrothermal actuators having various combinations of disc PTC heaters for differing areas and thicknesses.

To illustrate the premise that the response time of an actuator is dependent on the area and thickness of the heater element, empirical data was taken as found graphically in FIG. 8.

The units are in a linear scale and have been normalized to be a relative measure only.

The input voltage to the actuator forms the ordinate measure and is graphed as one variable while the response time of the actuator forms the second variable along the abscissa. Solid curve A represents a standard in which a PTC heater in a disc shape and of a thickness of 1 mm was energized at four differing voltages. At each voltage the response time of the actuator was measured and a data point taken. Smooth curve A was then drawn through these points to provide a continuous approximation of input voltage as a function of response time for this particular actuator.

The disc heater was then combined with a similar heater in parallel to effectively increase the heating area in the liquid by double. Solid curve B resulted when the same four input voltages are plotted as a function of the response time of the actuator. A decrease in response time is seen for all input voltages due substantially to the increase in heating area.

Another similar heater was added in parallel to the test heater structure and input voltage plotted as a function of response time. When the voltages used for curves A and B were used as data points, solid curve C resulted. Similarly as in curve B an increase in surface area obtained by adding an additional heater had decreased the response time to curve C.

Of course, there are practical limits to the amount of area available to the designer of an actuator and the effect is self-limiting, i.e., a doubling of area from curve A to curve B will give a greater percent decrease in response time for the amount of area added than will a tripling as from curve A to curve C. However, a general rule can be stated that an increase in heating surface area will enhance the response time of linear actuators.

The test actuator was subsequently run through these three curves once more but with the substitution of an 0.8 mm PTC disc instead of the 1 mm disc for the heating units compared. The results are the dotted curves A1, B1, C1, corresponding respectively, to solid curves A, B, and C. It is seen empirically that decreasing the thickness of a PTC heater further decreases response time and generally the decrease in thickness is independent of area considerations.

Therefore, the heater that has that largest surface area with the thinnest cross section will be the most advantageous. The annular configuration of heater 28 illustrated best combines maximum surface area as described above with a thin wall construction.

Figure 6:
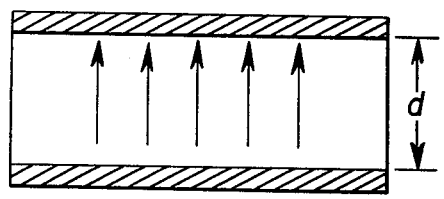
FIG. 6 is a cross sectional view of a wafer of PTC material.
Figure 7:
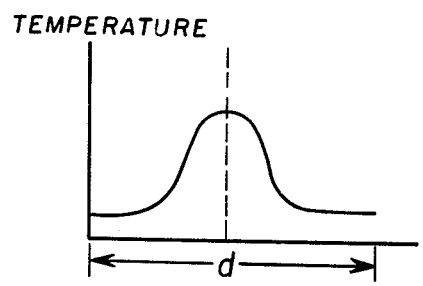
FIG. 7 is a graphical representation of the temperature gradient for the wafer illustrated in FIG. 6.

In accordance with another aspect of the invention the thin annular configuration is less susceptible to thermal shock. Thermal shock is caused in heating elements by the uneven heating between the edges of the element and its midplane. FIG. 6 illustrates a cross section of a wafer of PTC material having a thickness $d$. The current flows from the electrodes through the resistive element in the direction of the arrows creating a temperature gradient as illustrated in FIG. 7. It is seen at the midplane of the heating element that the maximum temperature for the element is found. But the farther one travels from the midplane the greater the temperature differential.

Thus the thinner the element of PTC material is the lower the temperature differential from the edge to the midplane will be. A heating element with a smaller temperature differential is less likely to be fractured by thermal shock than is a thicker element with a higher differential. This is important to the heater 28 which receives a considerable amount of energy or inrush power quickly to bring it up to temperature. Also, the surface of a heating element with a smaller differential in temperature will be hotter on the surface than a thicker element since its surface is theoretically closer to the maximum midplane temperature. The heater will cool faster and decrease cycle time because of its reduced thermal mass provided according to the invention by the thin wall of the annular heater 28. It is believed that the annular configuration for the heater 28 best provides these thin walls and reduced mass advantages while retaining structural integrity.

The heater 28 can be manufactured by various methods that are known in the art. One particular advantageous method is to form a PTC, doped $BaTiO_3$ reacted powder into a slurry with binders and plasticizers dissolved in a solvent such as toluene. The semi-liquid mass can then be subsequently pressure extruded into the annular configuration. The firing times and temperatures to produce the described electrical characteristics would be conventional. PTC powders of a composition $(Ba_{.997}La_{.003})TiO_3$ are commercially available from the TAM Division of National Lead Industries of Niagara Falls, N.Y.

While a preferred embodiment of the invention has been disclosed, it will be understood that various modifications obvious to one skilled in the art can be made thereto without departing from the spirit and scope of the invention as covered by the appended claims.

What is claimed is:

1. A self-regulating heater for an electrothermal actuator or the like including a working medium expandible upon heating to effect a mechanical output from the actuator, comprising: an integral elongated annulus of a positive temperature coefficient material having a low resistance to electrical current at ambient temperatures and an anomaly temperature above which the resistance of the material rises dramatically; said annulus including thin wall means for providing a relatively high resistance to thermal shock and a fast temperature rise in response to electrical energization; said annulus including inner and outer faces electrically connectible in an electric circuit to produce a heating current across the thin wall thereof; said annulus having a diameter and length for generally maximizing the heating surface area of said inner and outer faces to produce a rapid actuation of said actuator by expanding such a working medium and a relatively small thermal storage capacity, whereby upon termination of such electrical energization said annulus is capable of relatively prompt cooling.

2. A heater as defined in claim 1, wherein said positive temperature coefficient material is doped $BaTiO_3$.

3. A heater as defined in claim 1, wherein said working medium comprises an expansible liquid medium and the anomaly temperature of said annulus is greater than the boiling point of said liquid medium.

4. A heater as defined in claim 3, wherein the anomaly temperature is less than that which will produce partial film boiling in the liquid.

5. A heater as defined in claim 1, wherein said thin wall of said annulus has a thickness which exceeds the breakdown voltage of the positive temperature coefficient material.

6. A heater as defined in claim 5, wherein said thin wall of said annulus has a thickness which is less than that which will fail by thermal shock upon rapid heating.

7. A heater as defined in claim 1, further comprising an overcoating of electrical and thermally conductive material over said inner and outer faces to provide an even current distribution over the entire heating surface of said annulus while providing efficient thermal energy transfer relative to such working medium.

8. An electrothermal actuator having an enhanced actuation time comprising:

an end cap forming with a boiler enclosure an actuator body;

an elastomeric diaphragm separating said boiler enclosure from said end cap within said actuator body; said diaphragm being adapted to transform pressure changes within said boiler enclosure into a force;

a piston element reciprocating from an actuated position in response to said force from said diaphragm to an unactuated position in response to a return spring biasing said piston against said diaphragm within said end cap;

a heater assembly immersed in a pool of expansible medium within said boiler enclosure; said heater assembly adapted to provide thermal energy to said expansible medium upon passing a current therethrough, said expansible medium providing an increased pressure on said diaphragm in response to the thermal energy from said heater assembly thereby producing said force;

said heater assembly including a positive temperature coefficient heater means of an elongated annular configuration, having interior and exterior faces, for delivering thermal energy from said interior and exterior faces to said expansible medium, thereby reducing the actuation time of said actuator.

9. An electrothermal actuator having an enhanced actuation time comprising:

an end cap forming with a boiler enclosure an actuator body;

an elastomeric diaphragm separating said boiler enclosure from said end cap within said actuator body; said diaphragm being adapted to transform pressure changes within said boiler enclosure into a force;

a piston element reciprocating from an actuated position in response to said force from said diaphragm to an unactuated position in response to a return spring biasing said piston against said diaphragm within said end cap;

a heater assembly immersed in a pool of expansible medium within said boiler enclosure; said heater assembly adapted to provide thermal energy to said expansible medium upon passing a current therethrough, said expansible medium providing an increased pressure on said diaphragm in response to the thermal energy from said heater assembly thereby producing said force;

said heater assembly including a positive temperature coefficient heater means of an elongated annular configuration for delivering thermal energy to said expansible medium, said heater means being relatively thin walled and having a relatively small thermal storage capacity, whereby upon cut off of such current said heater means is capable of relatively prompt cooling.

10. An actuator as defined in claim 9, wherein said elongated annular heater means has interior and exterior faces in heat transfer exposure to said expansible medium for delivering thermal energy to the latter.

11. An actuator as set forth in claim 10, further comprising mounting means for mounting said heater means in said boiler enclosure with at least a portion of each of said interior and exterior faces being immersed in said expansible medium when the actuator is in an unactuated condition.

* * * * *